US006750180B1

(12) United States Patent
Argillier et al.

(10) Patent No.: US 6,750,180 B1
(45) Date of Patent: Jun. 15, 2004

(54) BOREHOLE FLUID CONTAINING A LUBRICATING COMPOSITION—METHOD FOR VERIFYING THE LUBRIFICATION OF A BOREHOLE FLUID—APPLICATION WITH RESPECT TO FLUIDS WITH A HIGH PH

(75) Inventors: Jean-François Argillier, Saint Cloud (FR); André Demoulin, Beauvechain (BE); Annie Audibert-Hayet, Croissy sur Seine (FR); Michel Janssen, Wezembeek-Oppem (BE)

(73) Assignees: Institut Francais du Petrole, Rueil-Malmaison Cedex (FR); Oleon NV, Ertvelde (BE)

( * ) Notice: Subject to any disclaimer, the term of this patent is extended or adjusted under 35 U.S.C. 154(b) by 0 days.

(21) Appl. No.: 09/719,352

(22) PCT Filed: Jun. 9, 1999

(86) PCT No.: PCT/FR99/01367

§ 371 (c)(1),
(2), (4) Date: Dec. 12, 2000

(87) PCT Pub. No.: WO99/66006

PCT Pub. Date: Dec. 23, 1999

(30) Foreign Application Priority Data

Jun. 12, 1998 (FR) .............................................. 98 07969

(51) Int. Cl.$^7$ ................................................. C09K 7/02

(52) U.S. Cl. ....................... 507/131; 507/244; 507/138; 507/265; 507/267
(58) Field of Search ................................. 507/131, 244, 507/138, 265, 267

(56) References Cited

U.S. PATENT DOCUMENTS

| 4,280,915 A | * | 7/1981 | Kercheville | .................. 507/131 |
| 5,510,452 A | * | 4/1996 | Santhanam | ................... 528/291 |
| 5,567,675 A | * | 10/1996 | Romocki | ..................... 507/244 |
| 6,221,920 B1 | * | 4/2001 | Hillion et al. | .................. 516/15 |
| 6,339,048 B1 | * | 1/2002 | Santhanam et al. | ......... 507/131 |
| 6,476,081 B1 | * | 11/2002 | Hillion et al. | ................. 516/15 |
| 6,492,430 B1 | * | 12/2002 | Hillion et al. | ................. 516/15 |

* cited by examiner

*Primary Examiner*—Philip C. Tucker
(74) *Attorney, Agent, or Firm*—Antonelli, Terry, Stout & Kraus, LLP

(57) ABSTRACT

The present invention relates to a borehole fluid comprising a lubricating compound containing at least one amphiphilic non-ionic compound obtained by reacting at least one vegetable oil or fatty acid as such or in a polymerized state on at least one amino alcohol. In one variant, the compound can be mixed with a solvent. The invention also relates to a method for verifying the lubrication power of a water-based fluid. The invention further relates to the application of said method to borehole fluids with a high pH.

9 Claims, No Drawings

BOREHOLE FLUID CONTAINING A LUBRICATING COMPOSITION— METHOD FOR VERIFYING THE LUBRIFICATION OF A BOREHOLE FLUID— APPLICATION WITH RESPECT TO FLUIDS WITH A HIGH PH

FIELD OF THE INVENTION

The present invention relates to fluids used for drilling, well completion or workover in wells. More particularly, the invention describes a water-base fluid comprising a lubricating compound, and a process for controlling the lubricating power of water-base fluids placed in boreholes. In an application, the water-base well fluids have a pH value above 9.

BACKGROUND OF THE INVENTION

The conventional method for drilling wells, petroleum wells or not, consists in driving in rotation a toothed bit fastened to the end of a drillpipe string, the string being generally driven in rotation by a surface installation. A fluid, referred to as drilling fluid or mud, is injected in the vicinity of the bit through the inner space of the drillpipes. The main functions of this fluid are to clean the bit and the well by driving the debris towards the surface, to stabilize the walls of the well, to inhibit reactions of geologic formations in contact with the fluid, etc.

The present invention does not only relate to fluids referred to as drilling fluids, but also to fluids referred to as completion fluids and to fluids referred to as workover fluids. Completion is an operation which continues the drilling operation when the well reaches the producing formation. Completion notably consists in drilling into the reservoir rock, testing the formation, equipping the well for production, bringing in the well. For these operations, the completion fluid can be specific notably to the reservoir rock and to the effluents produced. Workover operations consist in working in a producing well in order to drill, redrill, clean the well, or change well equipments.

Well fluids must have adjusted characteristics according to various uses, notably their viscosity, their density or their filtrate control capacity. In the case of greatly deflected wells, horizontal wellbores for example, or more generally wells leading to extensive friction on the tubulars lowered in the well, the lubricating capacity of the fluid becomes an important characteristic.

High-pH fluids are sometimes used, i.e. above 9 and generally above about 10, for example silicate-base drilling muds such as those described in the SPE 37,266 publication presented at the <<International Symposium on Oilfield Chemistry, 18–21 February 1997, Houston Tex.>>. These muds are recently used notably for their qualities as regards swelling inhibition of the clays drilled.

SUMMARY OF THE INVENTION

The present invention thus relates to a water-base well fluid comprising a lubricating compound containing at least one non-ionic amphiphilic compound obtained by reaction of at least one vegetable oil or one fatty acid on at least one aminoalcohol.

All the vegetable oils or vegetable fatty acids are suitable. The vegetable oil or fatty acid can be selected from the group consisting of linseed, safflower, grapeseed, wood, sunflower, rapeseed oil, or mixtures thereof, or of a fatty acid derived from these vegetable oils.

In a variant, the vegetable oil or fatty acid can be polymerized and have a viscosity ranging between 5 and 60 Pa.s at 20° C. after polymerization.

The aminoalcohol used can be diethanolamine.

The lubricating compound can be conditioned in form of a mixture comprising one or more solvents and possibly other compounds.

The solvent of the mixture can be a vegetable oil derivative.

The mixture (lubricating compound and solvents) can contain between 0 and 80% by mass of solvent and preferably between 20 and 40%.

The well fluid can comprise a concentration of 0.1 to 5% by weight of the lubricating compound, preferably ranging between 0.5 and 2% by weight.

The fluid according to the invention can have a pH value above 9, preferably above 10.

The invention also relates to a process for controlling the lubricating power of a water-base well fluid which consists in incorporating to the fluid a lubricating compound as defined above.

The invention comprises an application of the process above to well fluids having a pH value above 9 and preferably above 10.

Although all the vegetable oils or vegetable fatty acids can be suitable, greatly unsaturated oils are preferably used, such as linseed, safflower, grapeseed, wood, sunflower oil, or mixtures thereof. These vegetable oils or fatty acids are used as they are or polymerized. Polymerized vegetable oils (stand oils) are obtained by thermal treatment of the aforementioned greatly unsaturated vegetable oils, under such conditions that there is no oxidation. Linseed oil or fatty acid (preferably refined) is generally used, but it is also possible to use safflower, grapeseed, wood, sunflower oil or of fatty acid, or mixtures thereof. In order to prepare the lubricating compound according to a variant of the invention, a polymerized vegetable oil or fatty acid having a viscosity ranging between 5 and 60 Pa.s at 20° C. can be used. By way of example, the thermal treatment of a refined linseed oil at a temperature of 290–300° C. yields, after 6 to 12 hours, a product having a viscosity of 10 Pa.s at 25° C.

The aminoalcohols used to prepare the compounds of the invention are amines or polyamines comprising one or more alcohol groups and possibly one or more ether groups.

For example, the aminoalcohols can correspond to the following formulas:

HO—CmH2m-NH2
HO—CmH2m-NH—CkH(2k+1)
(HO—CmH2m)2-NH
(HO—CmH2m)3-N
(HO—CmH2m)p-CH(3-p)NH2
HO—(CmH2m-O)$_n$—NH—CkH(2k+1)
HO—(CmH2m-O)$_n$—CkH2k-NH2
HO—(CmH2m-O)$_n$—NH—CkH2k-(O—CmH2m)$_n$-OH
  branched or not with m=2 to 6; k=1 to 6; p=2 or 3; n=2 to 20

One can mention in particular:

monoethanolamine: OH—(CH2)2-NH2,
monopropanolamine: OH—(CH2)3-NH2,
monoisopropanolamine: CH3-CH(OH)—CH2-NH2,
2-amino-1-butanol: CH3-CH2-CH(NH2)CH2-OH,
1-amino-2-butanol: CH3-CH2-CH(OH)—CH2-NH2, N-methyl-ethanolamine: CH3-NH—(CH2)2-OH,
N-butyl-ethanolamine: CH3-(CH2)3-NH—(CH2)2-OH,
pentanolamine, hexanolamine, cyclohexanolamine, polyalkanolamines or polyalkoxyglycolamines, with the following formula:
OH—(CH2-CH2-O)n-CH2-CH2-NH2 (n between 1 and 30),
and aminopolyols such as:

diethalonamine: (OH—CH2-CH2)2-NH,
diisopropanolamine: (CH3-CH(OH)—CH2)2-NH, or
trihydroxymethylaminomethane: ((HO)H2C-)3C—NH2.

The synthesis of the compounds of the invention can be obtained by reacting excess aminoalcohol, preferably diethanolamine, on a vegetable oil or a vegetable fatty acid as it is, or polymerized, preferably obtained from linseed oil.

The reaction is preferably carried out in the absence of solvent, generally at a temperature above about 100° C., and preferably ranging between 100 and 200° C.

However, if the viscosity of the reaction medium is too high, the reaction can be carried out in the presence of a solvent.

The lubricating compound included in the fluid according to the invention is obtained at the end of the reaction.

This compound can be incorporated to the high-pH aqueous well fluid as it is or not, or in form of a mixture comprising a solvent or several solvents and possibly other compounds.

In order to obtain a mixture having an acceptable viscosity, considering the applications envisaged, a solvent can be added. A certain number of solvents can be used, in particular aromatic cuts; however, all the solvents derived from natural oils are preferably used, such as C6 to C18 fatty acid esters and C2 to C18 linear or branched alcohol esters, in order to obtain a biodegradable and non-polluting additives solution.

When used as lubricating additives for a well fluid, these compounds are added to the well fluid at concentrations generally ranging from 0.1 to 5% by mass, preferably from 0.5 to 2% by mass.

It can be noted that the regulations relative to environmental protection increasingly require the use of non-toxic and non-polluting additives in the formulation of well fluids.

The well fluid according to the present invention comprising the lubricating composition notably has the advantage of meeting the current criteria relative to environmental protection.

Furthermore, the present composition can be used with all the high-pH water-base well fluids, for example, silicate-base fluids, weighted or not, certain high-pressure/high temperature (HP/HT) fluids, etc.

High pH values are difficult conditions for the stability of lubricating products, in particular those based on conventional esters which hydrolyze at a high pH value and under the effect of the temperature.

DETAILED DESCRIPTION

Other features and advantages of the invention will be clear from reading the description hereafter of non limitative examples.

The lubricating power of a lubricating composition added to a well fluid according to the invention is tested by means of a <<(Lubricity tester-Model 212>> manufactured by the NL Baroid Petroleum Services company (Instruction Manual Part No.211210001EA). The tests (<<Lubricity-surface to surface>>) are carried out according to the procedures recommended by the RP 13B standard of the American Petroleum Institute (API) (100 psi (689 kPa) at 60 rpm). In order to compare the lubricating capacities of various compositions, the graduations obtained with the testing device described above were read. These readings correspond to relative values of the friction torque. The lower these values, the higher the lubricating power of the composition tested The principle of the examples given hereafter is to mix with a base fluid a certain amount of a determined lubricating composition, the mixture being then tested in the device. The tests, unless otherwise indicated, were carried out at ambient temperature (about 25° C.).

A first lubricating composition, given by way of example, and added to the base well fluid, is referred to as NTL.

NTL is the result of the reaction of 52 kg polymerized linseed oil having a viscosity of 10 Pa.s with 28 kg diethanolamine, in a 100-liter reactor, heated for one hour at 160° C. Its viscosity is of the order of 2700 mPa.s at 40° C.

A second lubricating composition, referred to as XTL, is the product of the reaction of 52 kg linseed oil with 28 kg diethanolamine in the same reactor as above and under the same conditions.

EXAMPLE 1

Silicate Mud Before Aging

Composition of the base fluid:

| | |
|---|---:|
| fresh water | |
| viscosifier (xanthan) | 5.2 g/l |
| filtrate reducer (Aquapac-Regular) | 0.14 g/l |
| filtrate reducer (Aquapac-LV) | 2.51 g/l |
| filler clay | 20 g/l |
| sodium silicate | 84.7 g/l |
| sodium chloride | 50 g/l |
| barite | 93 g/l |
| NaOH in order to obtain: | pH = 11. |

The xanthan used for all the tests is IDVIS marketed by the Dowell Drilling Fluids company.

The CMC AQUAPAC Regular and LV type products are marketed by the Aqualon company.

This test shows the lubricating power of the lubricant NTL added to a high-pH base fluid according to the concentration by weight.

| Lubricant NTL | Torque reading | |
|---|---|---|
| (%) | (lbs.in) | N.m |
| 0 | 42 | 4.75 |
| 0.5 | 25 | 2.8 |
| 1 | 23 | 2.6 |
| 1.5 | 21 | 2.4 |
| 2 | 17 | 1.9 |
| 3 | 17 | 1.9 |
| 4 | 17 | 1.9 |
| 5 | 17 | 1.9 |

A decrease in the value of the torque can be observed as the lubricant concentration increases. The results show the good performances of the NTL system with this high-pH formulation. A lubricating additive concentration of the order of 2% is optimum here.

EXAMPLE 2
Silicate Mud After Aging

The formulation of the previous base fluid is used, mixed with 2% NTL that has been aged in a <<Hot Rolling>> test cell at 80° C. for 16 hours, then return to ambient temperature. The following results show that temperature aging does not degrade the lubricating properties of the NTL additive in a high-pH mud.

|  | Torque reading | |
| --- | --- | --- |
|  | (lbs.in) | (N.m) |
| Before aging | 17 | 1.9 |
| After aging | 18 | 2.03 |

EXAMPLE 3
Influence of the Lubricant on the Rheological and Filtering Properties of the Mud The theological properties of the mud are expressed hereafter in VA, apparent viscosity, in centipoise (cP), VP, plastic viscosity, in centipoise (cP), YV is the yield value in lb/100 ft$^2$ and gel 0 and gel 10 (these measurements are in accordance with the API RP 13B1 standard which gives the correspondences of the SI units in Appendix I), with and without NTL, before (AV) and after (AP) 16-hour aging at 80° C., as well as the filtering properties expressed by the corrected amount of filtrate (in cm$^3$) obtained after 30-minute filtration.

The formulation of the base fluid is the same as that of the silicate mud in example 1.

|  | without NTL (AV) | with 2% NTL (AV) | without NTL (AP) | with 2% NTL (AP) |
| --- | --- | --- | --- | --- |
| VA | 34 | 41 | 32 | 43 |
| VP | 11 | 20 | 17 | 22 |
| YV | 46 | 42 | 30 | 42 |
| Gel 0/ Gel 10 | 11/15 | 5/8 | 8/10 | 8/15 |
| Filtrate (ml) | 2.6 | 2.0 | 4.6 | 3.9 |

These results show that addition of the optimized percentage of NTL does not significantly modify the theological and filtering properties of the mud, whether before or after aging.

EXAMPLE 4
Dilution of NTL by a Solvent

Various lubricating compounds were tested (L1, L2, L3, L4, L5, L6), all representative of the present invention. The percentages are expressed by weight. The viscosities measured at 40° C. are given in the table hereunder.

| Mixtures | Viscosity (mPa · s) |
| --- | --- |
| L1: NTL-100% | 2670 |
| L2: NTL-80% + Methyl oleate-20% | 790 |
| L3: NTL-70% + Methyl oleate-30% | 410 |
| L4: NTL-80% + 2-butyl C12–C14-20% | 710 |
| L5: NTL-70% + 2-butyl C12–C14-30% | 385 |
| L6: NTL-70% + 2-butyl C12–C14-30% + 2-octanol (5% in relation to the 2-butyl C12–C14) | 350 |

The lubricating performances and the characteristics of the various mixtures are given hereafter. The mixtures were added in a proportion of 1 or 2% by weight to the formulation of silicate mud of example 1.

| Concentration | Torque reading | | VA | VP | YV |
| --- | --- | --- | --- | --- | --- |
| % | (lbs.in) | (N.m) | mPa · s | mPa · s | lbs/100 ft$^2$ |
| Before aging | | | | | |
| L1 | 2 | 17 | 1.9 | 41 | 20 | 42 |
| L2 | 2 | 18 | 2.03 | 42 | 19 | 46 |
| L3 | 1 | 24 | 2.7 | 34 | 13 | 42 |
| L4 | 1 | 24 | 2.7 | 31 | 14 | 34 |
| L4 | 2 | 18 | 2.03 | 33 | 15 | 36 |
| L5 | 2 | 20 | 2.3 | 40 | 19 | 42 |
| L6 | 2 | 18 | 2.03 | 39 | 18 | 42 |
| After 16-hour aging at 80° C. | | | | | |
| L1 | 2 | 18 | 2.03 | 43 | 22 | 42 |
| L4 | 2 | 19 | 2.15 | 34 | 15 | 38 |
| L6 | 2 | 18 | — | 39 | 18 | 42 |

These results show the very good performances of the systems studied in terms of lubrication. The main interest of using a diluent is to reduce the viscosity of additive NTL, which facilitates its incorporation to the aqueous fluid.

EXAMPLE 5
Silicate Mud and Compound XTL

The formation of silicate mud of example 1 is used, before aging and after aging as described in example 2.

| Lubricant XTL | Torque reading | |
| --- | --- | --- |
| (%) | lbs.in | N.m |
| Before aging | | |
| 0 | 42 | 4.75 |
| 0.5 | 26 | 2.9 |
| 1 | 24 | 2.7 |
| 1.5 | 22 | 2.5 |
| 2 | 22 | 2.5 |
| 3 | 22 | 2.5 |
| After aging | | |
| 2 | 22 | 2.5 |

These results show that lubricating compound XTL allows to significantly decrease frictions. Its characteristics are not altered after aging.

EXAMPLE 6
Seawater Bentonite Mud

Composition of the base fluid:

| | |
| --- | --- |
| seawater | |
| bentonite | 30 g/l |
| viscosifier (xanthan) | 2 g/l |
| filtrate reducer (Aquapac-LV) | 1 g/l |
| dispersant | 3 g/l |
| barite, such that the density | SG = 1.2 kg/l. |

The dispersant used is polyacrylate FP30S marketed by the COATEX company (France).

The pH value of the formulation is adjusted to soda NaOH, so that pH=9 or pH=12.

This test gives the results of the lubricating power of the high-pH fluid according to the concentration of lubricant NTL added.

| Lubricant NTL | Torque reading | | | |
|---|---|---|---|---|
| | pH 9 | | pH 12 | |
| % | lbs.in | N.m | lbs.in | N.m |
| 0 | 36 | 4.07 | 36 | 4.07 |
| 0.5 | 34 | 3.84 | 32 | 3.62 |
| 1 | 31 | 3.5 | 21 | 2.37 |
| 2 | 31 | 3.5 | 18 | 2.04 |
| 3 | 25 | 2.8 | 18 | 2.04 |
| 4 | 21 | 2.37 | 18 | 2.04 |
| 5 | 19 | 2.15 | 16 | 1.81 |

These results show the very good lubricating performances of NTL, notably at a high pH value.

EXAMPLE 7

Cesium Formate Mud

Composition of the base fluid:

| | |
|---|---|
| seawater | |
| viscosifier (xanthan) | 2 g/l |
| filtrate reducer | 2 g/l |
| filling clay | 10 g/l |
| KCl | 50 g/l |
| CsCOOH, H2O (hydrated cesium formate): 300 g/l, so that the density | SG = 1.2 kg/l. |

The pH value of the formulation is adjusted to soda NaOH, so that pH=9 or pH=12.

This test shows the lubrication results according to the concentration of lubricant NTL added.

| Lubricant NTL | Torque reading | | | |
|---|---|---|---|---|
| | pH 9 | | pH 12 | |
| % | lbs.in | N.m | lbs.in | N.m |
| 0 | 36 | 4.07 | 40 | 4.52 |
| 0.5 | 16 | 1.81 | 18 | 2.04 |
| 1 | 4 | 0.45 | 6 | 0.68 |
| 2 | 2 | 0.23 | 2 | 0.23 |
| 3 | 2 | 0.23 | 2 | 0.23 |

These measurements show the very good lubricating performances of NTL in this type of very high-pH fluid.

What is claimed is:

1. A water-base well fluid comprising a lubricating composition containing at least one non-ionic amphiphilic compound obtained by reaction of at least one polymerized vegetable oil having a viscosity ranging between 5 and 60 Pa.s at 20° C. or at least one polymerized fatty acid having a viscosity ranging between 5 and 60 Pa.s at 20° C. on at least one aminoalcohol, characterized in that the lubricating composition is conditioned in form of a mixture comprising at least one solvent, and that said solvent is a vegetable oil derivative selected from the group consisting of C6 to C18 fatty acid esters and C2 to C18 linear or branched alcohol esters.

2. A fluid as claimed in claim 1, characterized in that said aminoalcohol is diethanolamine.

3. A fluid in claim 1, characterized in that said mixture contains between 0 and 80% by mass of solvent.

4. A fluid as claimed in claim 1, characterized in that it comprises a concentration of 0.1 to 5% by weight of said lubricating composition.

5. A fluid as claimed in claim 4, characterized in that said concentration ranges between 0.5 and 2% by weight.

6. A fluid as claimed in claim 1, characterized in that its pH value is above 9.

7. A water-base well fluid comprising a lubricating composition containing at least one non-ionic amphiphilic compound obtained by reaction of at least one polymerized vegetable oil having a viscosity ranging between 5 and 60 Pa.s at 20° C. on at least one aminoalcohol.

8. A fluid as claimed in claim 7, wherein said at least one polymerized vegetable oil is selected from the group consisting of polymerized linseed oil, polymerized safflower oil, polymerized grapeseed oil, polymerized wood oil, polymerized sunflower oil and mixtures thereof.

9. A fluid as claimed in claim 7, characterized in that said aminoalcohol is diethanolamine.

\* \* \* \* \*